United States Patent
Madden et al.

(10) Patent No.: US 8,964,850 B2
(45) Date of Patent: Feb. 24, 2015

(54) METHOD, APPARATUS AND SYSTEM FOR CONVERGING IMAGES ENCODED USING DIFFERENT STANDARDS

(71) Applicant: Intellectual Ventures Fund 83 LLC, Las Vegas, NV (US)

(72) Inventors: Thomas E. Madden, Fairport, NY (US); John P. Spence, Webster, NY (US); William V. Fintel, Pittsford, NY (US); John T. Keech, Painted Post, NY (US); Esther M. Betancourt, Rochesster, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

(21) Appl. No.: 14/138,504

(22) Filed: Dec. 23, 2013

(65) Prior Publication Data

US 2014/0105495 A1    Apr. 17, 2014

Related U.S. Application Data

(62) Division of application No. 12/211,141, filed on Sep. 6, 2008, now Pat. No. 8,638,858.

(60) Provisional application No. 61/078,900, filed on Jul. 8, 2008.

(51) Int. Cl.
    *H04N 7/12*  (2006.01)
    *G06T 9/00*  (2006.01)
    *G09G 5/02*  (2006.01)
    *H04N 1/60*  (2006.01)
    (Continued)

(52) U.S. Cl.
    CPC .. *G06T 9/00* (2013.01); *G09G 5/02* (2013.01); *H04N 1/6052* (2013.01); *H04N 9/045* (2013.01); *H04N 9/67* (2013.01); *G09G 2320/0276* (2013.01); *G09G 2320/0666* (2013.01); *G09G 2320/0673* (2013.01); *G09G 2340/06* (2013.01)
    USPC .................................................... 375/240.18

(58) Field of Classification Search
    None
    See application file for complete search history.

(56) References Cited

U.S. PATENT DOCUMENTS 5,019,975 A    5/1991  Mukai
5,550,646 A    8/1996  Hassan et al.
(Continued)

FOREIGN PATENT DOCUMENTS

EP    0 604 755    7/1994
JP    10-143680    5/1998

OTHER PUBLICATIONS

"Smile, You're on Yahoo! Photos" Mar. 28, 2000 Release Detail, 1 page.

(Continued)

*Primary Examiner* — David Pearson

(57) ABSTRACT

A method for transforming an image expressed in terms of a first image encoding to a second image encoding, includes converting a set of original scene exposure-factor values into corresponding first and second image encoding values. A transform is then derived between the first image encoding values and the second image encoding values. The transform is then applied to an image encoded in said first image encoding. Examples of different encoding that can be transformed include Rec. 709, sRGB and other known image encoding standards. A system for performing such transformations as well as an electronic device that is capable of performing such transformations are also disclosed.

20 Claims, 7 Drawing Sheets

(51) Int. Cl.
*H04N 9/04* (2006.01)
*H04N 9/67* (2006.01)

(56) References Cited

U.S. PATENT DOCUMENTS

| | | | |
|---|---|---|---|
| 5,666,215 | A | 9/1997 | Fredlund et al. |
| 5,760,917 | A | 6/1998 | Sheridan |
| 5,802,220 | A | 9/1998 | Black et al. |
| 5,832,464 | A | 11/1998 | Houvener et al. |
| 6,004,061 | A | 12/1999 | Manico et al. |
| 6,154,772 | A | 11/2000 | Dunn et al. |
| 6,182,133 | B1 | 1/2001 | Horvitz |
| 6,241,668 | B1 | 6/2001 | Herzog |
| 6,462,778 | B1 | 10/2002 | Abram et al. |
| 6,629,104 | B1 | 9/2003 | Parulski et al. |
| 6,721,952 | B1 | 4/2004 | Guedalia et al. |
| 7,028,253 | B1 | 4/2006 | Lieberman et al. |
| 7,454,090 | B2 | 11/2008 | Wilcock et al. |
| 8,014,027 | B1 | 9/2011 | Kulkarni et al. |
| 2001/0022621 | A1 | 9/2001 | Squibbs |
| 2001/0041020 | A1 | 11/2001 | Shaffer et al. |
| 2001/0046330 | A1 | 11/2001 | Shaffer et al. |
| 2002/0008762 | A1* | 1/2002 | Takemoto ............ 348/223 |
| 2002/0013161 | A1 | 1/2002 | Schaeffer et al. |
| 2002/0049738 | A1 | 4/2002 | Epstein |
| 2002/0055955 | A1 | 5/2002 | Lloyd-Jones et al. |
| 2002/0097894 | A1 | 7/2002 | Staas et al. |
| 2003/0009469 | A1 | 1/2003 | Platt et al. |
| 2004/0246526 | A1 | 12/2004 | Ishigami et al. |
| 2005/0083352 | A1 | 4/2005 | Higgins |
| 2005/0149572 | A1 | 7/2005 | Kanai et al. |
| 2007/0150389 | A1 | 6/2007 | Aamodt et al. |
| 2007/0268378 | A1 | 11/2007 | Hsu |
| 2008/0094515 | A1 | 4/2008 | Gutta et al. |
| 2009/0067506 | A1* | 3/2009 | Doser ............ 375/240.18 |
| 2011/0214144 | A1 | 9/2011 | Girouard et al. |

OTHER PUBLICATIONS

"Colorimetry for HDTV" by LeRoy DeMarsh, IEEE Transactions on Consumer Electronics, vol. 37, No. 1, Feb. 1991, pp. 1-6.
"Digital Color Management" Encoding Solutions by Edward J. Giorgianni et al., pp. 61-69, 83-97 and 474-478, 1998.
"Digital Still Camera Image File Format Standard (Exchangeable image file format for digital still cameras: Exif)", Version 2.1, Jun. 12, 1998, 172 pages.
"Digital Video and HDTV Algorithms and Interfaces" by Charles Poynton, pp. 81-86 and 257-280, 2003.
"Emotion Recognition in Human-Computer Interaction", by R. Cowie et al., IEEE Signal Processing Magazine, vol. 18, No. 1, Jan. 2001, pp. 32-80.
"Facial Expression Recognition using a Dynamic Model and Motion Energy", by Irian Essa et al. MIT Media Laboratory Perceptual Computing Section Technical Report No. 307, pp. 1-8. 1995.
"FotoFile: A Consumer Multimedia Organization and Retrieval System", by Allan Kuchinsky et al., Hewlett Packard Laboratories, 1501 Page Mill Road. about. Palo Alto, CA 94304 USA. 1999, 8 pages.
"Looking at Pictures: Affective, facial, visceral, and behavioral reactions", by Peter J. Lang et al, Psychophysiology, 30 (1993), 261-273.
"The Reproduction of Colour in Photography, Printing and Television", by Dr. R. W. G. Hunt, 1981 (8 pages, Title page and Table of Contents).

"The Sentic Mouse: Developing a tool for Measuring Emotional Valence", by Dana Kirsch, May 1997, 46 pages.
Communication from the European Patent Office on EP02 080339.1, dated Jun. 27, 2006.
Dillon et al, Aroused and Immersed: The Psychophysiology of Presence, Goldsmiths College, University of London, 2000, 6 pages.
Final Office Action on U.S. Appl. No. 12/211,141, mailed Aug. 6, 2012.
Final Rejection on U.S. Appl. No. 12/541,224, mailed Dec. 10, 2010.
International Preliminary Report on Patentability for PCT/US2009/003793, issued Jan. 11, 2011.
International Search Report and Written Opinion for PCT/US2009/003793, mailed Oct. 1, 2009.
Matthew Anderson et al: "Proposal for a Standard Default Color Space for the Internet-SRGB", Final Program and Proceedings of the IS&T/SID Color Imaging Conference: Color Science, Systems, and Applications, XX, XX, Nov. 19, 1996, pp. 238-246.
Non-Final Office Action on U.S. Appl. No. 11/456,620, mailed Mar. 4, 2009.
Non-Final Office Action on U.S. Appl. No. 12/211,141, mailed Mar. 5, 2012.
Non-Final Office Action on U.S. Appl. No. 12/211,141, mailed May 17, 2013.
Non-Final Office Action on U.S. Appl. No. 12/541,224, mailed Jul. 26, 2010.
Non-Final Office Action on U.S. Appl. No. 13/476,597, mailed Jun. 14, 2013.
Non-Final Office Action on U.S. Appl. No. 12/541,233, mailed Mar. 19, 2010.
Notice of Allowance on U.S. Appl. No. 11/456,620, mailed Jul. 23, 2009.
Notice of Allowance on U.S. Appl. No. 12/211,141, mailed Sep. 19, 2013.
Notice of Allowance on U.S. Appl. No. 12/541,224, mailed Jun. 10, 2011.
Notice of Allowance on U.S. Appl. No. 12/541,233, mailed Oct. 29, 2010.
Notice of Allowance on U.S. Appl. No. 13/227,287, mailed Feb. 6, 2012.
Notice of Allowance on U.S. Appl. No. 13/476,597, mailed Mar. 21, 2013.
Notice of Allowance on U.S. Appl. No. 13/476,597, mailed Sep. 13, 2013.
R. W. Picard et al., Affective Intelligence—The Missing Link?, BT Technology Journal, vol. 14, No. 4, Oct. 1997, pp. 150-160.
R. W. Picard et al., Affective Wearables, IEEE Comput. Soc., Oct. 13, 1997, pp. 90-97.
R. W. Picard et al., Modeling User Subjectivity in Image Libraries, Proceedings International Conference on Image Processing, vol. 2, 1996, pp. 777-780.
R. W. Picard et al., Toward Machine Emotional Intelligence: Analysis of Affective Physiological State, IEEE Transactions on Pattern Analysis and Machine Intelligence, vol. 23 No. 10, Oct. 2001, pp. 1175-1191.
R. W. Picard, Affective Computing, Online, 1995, 26 pages.
R. W. Picard, Building HAL: Computers That Sense, Recognize, and Respond to Human Emotion, Proceedings of the SPIE—The International Society for Optical Engineering, vol. 4299, 2001, pp. 518-523.
Rob Roy, DVD From Hollywood Video Rentals, SSBN 0-7928-3366-X, Metro Goldwyn Mayer (MGM) @ 1995.
Search Report for EP application 02080339.1, dated Nov. 5, 2008.

* cited by examiner

METHOD, APPARATUS AND SYSTEM FOR CONVERGING IMAGES ENCODED USING DIFFERENT STANDARDS

CROSS-REFERENCE TO RELATED PATENT APPLICATIONS

This application is a Divisional of U.S. application Ser. No. 12/211,141, filed Sep. 16, 2008, which claims priority from Provisional Application U.S. Application 61/078,900, filed Jul. 8, 2008, incorporated herein by reference in their entirety.

FIELD

This disclosure relates in general to electronic systems and more particularly to image encoding systems such as sRGB and broadcast video systems.

BACKGROUND

In broadcast video systems, original motion image sequences are captured using an image-capture device, such as a broadcast video camera, which produces image-bearing signals. The image-bearing signals produced by the camera are encoded according to the ITU-R Recommendation BT.709, more commonly referred to by the abbreviation Rec. 709 broadcast-video encoding standard. The encoded image-bearing signals are then used to produce a displayed image on a television receiver.

Likewise, in digital still-image photography systems, original-scene still images are captured using an image-capture device such as a digital still camera, the image-bearing signals produced by the camera are encoded in one of a variety of still-image encoding metrics or standards, such as the European Standard EN 61966-2-1:2000 with the incorporation of amendment A1:2003 being exemplary and referred to as the sRGB color space standard. The encoded still image data are used to produce a color image on a computer display, such as CRT or LCD monitor.

A convergence of these two systems would enable images from either source (i.e. sRGB or Rec. 709 broadcast video signals) to be displayed and viewed using either output system (e.g. a computer display or a television receiver) with consistent displayed image quality.

DETAILED DESCRIPTION OF THE PREFERRED EMBODIMENTS

It is commonly assumed that sRGB image data are equivalent or compatible to broadcast video image data. However, direct display of sRGB image data on broadcast video equipment results in image reproduction that is incompatible with images from standard video sources. sRGB images appear too light, high in contrast and high in chroma when displayed directly on broadcast video compatible equipment. The problem is exhibited when sRGB images are input via multiple standard input connectors such as HDMI, Component, S-Video, VGA, Composite, SD, USB, DF, etc.

The disclosure implements a novel pre-processing of sRGB image data prior to input to broadcast compatible video equipment, resulting in display image quality equivalent to the image quality from broadcast standard video signals. In one embodiment the pre-processing can be accomplished using one or more Look-Up-Tables (LUTs). In another embodiment, a video signal created directly from sRGB image data is post-processed prior to display or output to broadcast compatible video equipment.

The broadcast video and digital still photography systems each evolved to optimize the visual quality of their respective reproduced images in response to the colorimetric characteristics of the image-capture and image-display devices involved and the conditions under which the reproduced images typically are viewed. While both systems make use of electronic cameras and electronic displays using similar technology, there are differences in the colorimetric characteristics of the respective image-capture and image-display means between the systems, as well as differences between the viewing conditions under which the images reproduced by each system is typically assumed to be viewed that must be accounted for in a successful convergence of the two systems.

Figure 1:
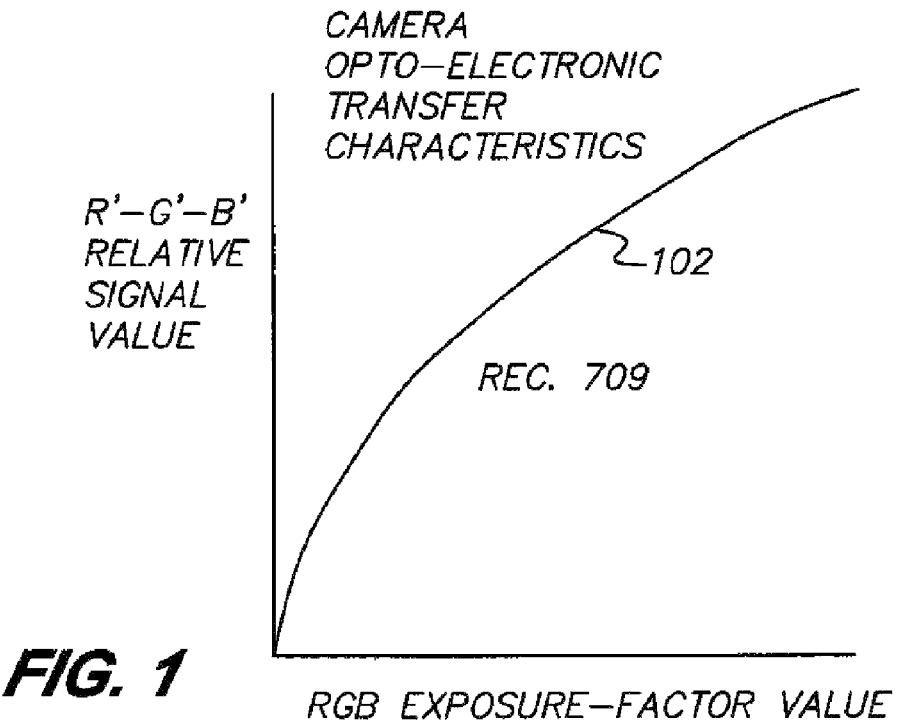
FIG. 1 shows a graph of the optoelectronic transfer characteristics of Rec. 709.

Rec. 709 is an image-capture and encoding specification based on a set of reference color primaries and an optoelectronic transfer 102 shown in FIG. 1. These attributes define the relationship between the colors in original scenes and the corresponding RGB signal values that a Rec. 709 compliant camera should deliver for those colors. Further steps in the encoding process can and are typically performed such as conversions from RGB to luma and chroma components, conversions to 8-bit realizations, etc. Providers of signals for video broadcast are motivated to adhere to this encoding standard in order that the images ultimately displayed from these video signals are compatible in appearance with images generated by other providers of video image signals. In turn, receivers of broadcast video signals interpret such signals as if they indeed were encoded according to the Rec. 709 standard. In this way, the same output color-signal processing can be applied to broadcast video image signals from all sources and providers with predictable and consistent results across signal sources as long as the Rec. 709 standard applies to the generation of the video signals. If the Rec. 709 standard is not adhered to in the capture and subsequent encoding in the original scene, then the appearance of the displayed image can be disparate and incompatible with the appearance of images captured and encoded according to the standard.

The Rec. 709 recommendation is an image-capture and encoding standard, defining the relationship between original scene colorimetry and the corresponding R'G'B' signals resulting from the capture of those colors using an image-capturing means such as broadcast video camera. The recommendation does not specify how those signals are to be used to create reproduced images or how those reproduced images should be viewed. So, the colorimetry and the color appearance of reproduced broadcast video images are open to interpretation. Specifically, this will depend on the colorimetric characteristics of the image-reproducing means (e.g. a CRT display) and the conditions under which the reproduced image will be viewed, which will affect the relationship between colorimetry and color appearance. However, many assumptions along these lines are prevalent based on decades of experience with the broadcast video system.

In "Colorimetry for HDTV" by LeRoy DeMarsh, it is stated that the opto-electronic transfer function for broadcast video " . . . is the sort of function currently implemented in many high quality broadcast color TV cameras and is known to produce high quality pictures on current TV monitors." At the time that statement was made, virtually all TV monitors of the day utilized CRT technology. The grayscale characteristic of typical CRT displays is well known in the art, and the relationship between the RGB input signals and output luminances on the display obey a power law relationship, given by the value of an exponent gamma.

Figure 2:
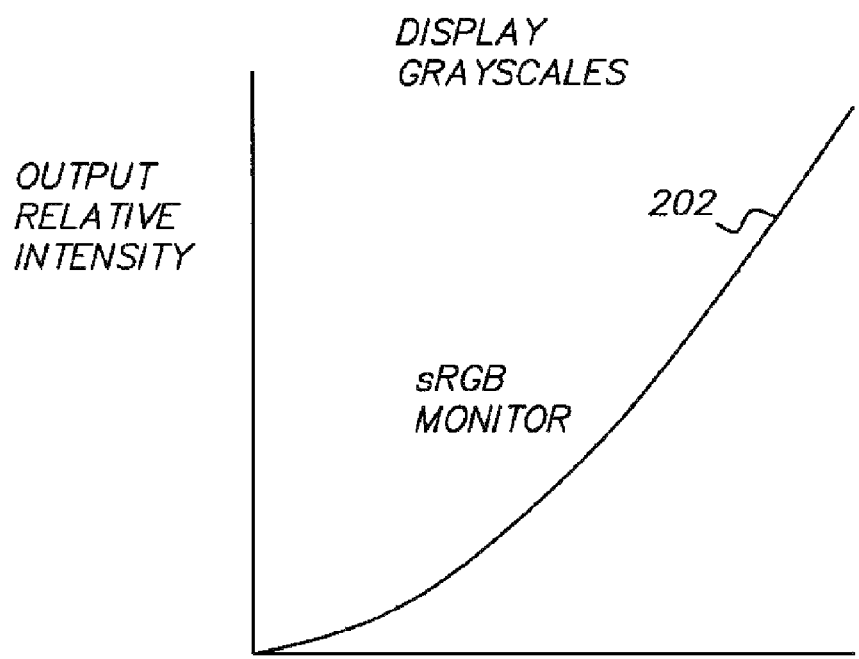
FIG. 2. shows a graph of the transfer characteristics of sRGB.

The sRGB color space, developed for the encoding of digital still photography images is similar in many respects to Rec. 709. It is based on the same set of reference color primaries and white point as Rec. 709. The sRGB color space however specifies the colorimetric characteristics not of a camera, but of a reference video monitor, based on the characteristics of typical CRT-based computer monitors prevalent at the time the sRGB color space was developed, which is shown in FIG. 2 as graph line 202.

Since Neither Rec. 709 nor sRGB by themselves specify the relationship between original-scene colorimetry and reproduced colorimetry, and since Rec. 709 is an image-capture and encoding specification, and the sRGB color space is an image reproduction and viewing specification, and both specifications are based on the same set of reference color primaries and reference white chromaticity, and both are based on power-law and inverse power law relationships for the respective reference camera and reference display, it would seem reasonable that images encoded according to one of the standards could be output using the complementary system and expect good quality results. In other words, it would seem reasonable to couple the image capture and encoding specification with the image-display and reproduction specification to create a complete system for the capturing, encoding and displaying images.

If that were true, then in turn it should be possible for digital still image files encoded in terms of the sRGB specification to be displayed and viewed on televisions intended for broadcast applications. Likewise, it should be possible for motion video sequence files encoded according to Rec. 709 to be displayed and viewed on an sRGB monitor under sRGB viewing conditions. That indeed is the practice with digital still cameras, home media players, and the like, wherein sRGB values are used directly to generate motion image bearing signals for a television display. However, the results almost always are substandard because such reproduced images tend to appear too light, too high in luminance contrast, and too high in overall colorfulness compared to Rec. 709 motion image sequences display and viewed similarly.

Likewise, motion image sequences encoded according to Rec. 709 are commonly displayed and viewed on computer displays which more-or-less conform to the sRGB color space specifications. And again, these results almost always are substandard because such reproduced motion image sequences tend to appear too dark, too low in luminance contrast, and too low in overall colorfulness compared to sRGB images displayed and viewed similarly. Therefore, it is necessary to provide a transformation between the sRGB and Rec. 709 encodings to provide reproduced images of high quality.

Figure 3:
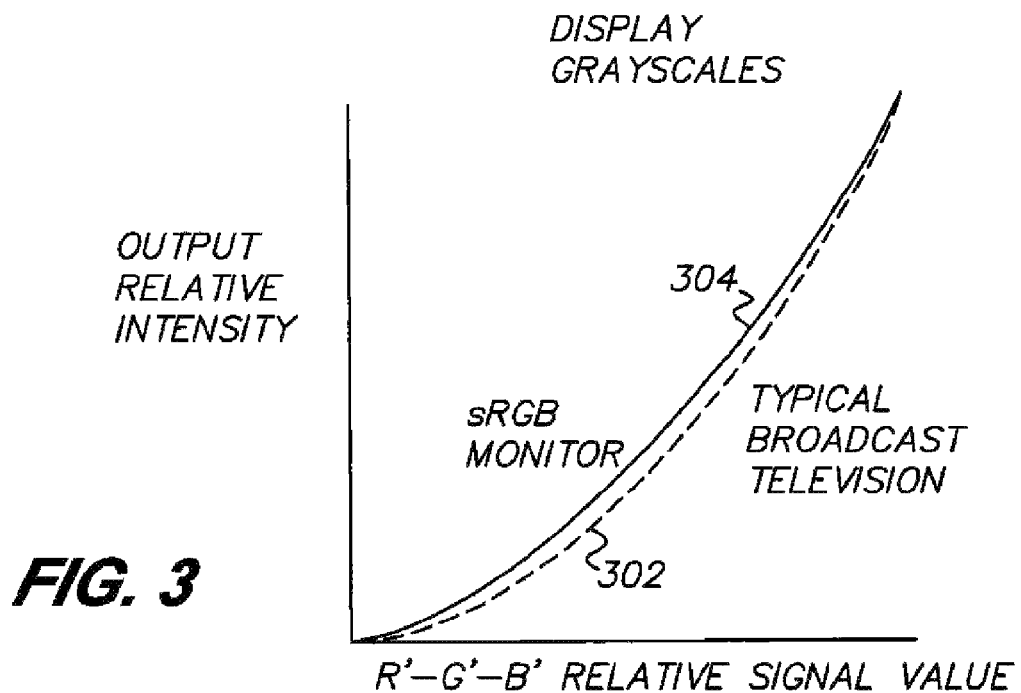
FIG. 3 shows a graph highlighting different gammas for sRGB.

This degradation in reproduced image quality for the converged systems is due to a number of factors, one of which is the difference in the power law relationships for an assumed broadcast television and that of the sRGB reference monitor. Charles Poynton in his book entitled "Digital Video and HDTV Algorithms and Interfaces", 2007, states on p. 264 that "Rec. 709 encoding assumes that encoded R'G'B' signals will be converted to tristimulus values at a CRT (or some other display device) with a 2.5-power function.", see for example graph line 302 in FIG. 3. The IEC sRGB specification gives a precise piecewise mathematical relationship for the translation between encoded values and resulting RGB relative intensity values that includes a linear portion at the dark end of the characteristic and a power-law relationship with scalar and offset terms for the mid and lighter regions of the characteristic. The IEC document also states that a simple power-law relationship of gamma=2.2 provides a reasonably good approximation to the overall characteristic.

It is noted therefore that the typical broadcast video display grayscale characteristic is somewhat higher in gamma than the reference sRGB monitor. That means that for a given sequence of R'=G'=B' encoded signal values corresponding to neutral (achromatic) colors, a broadcast video display will reproduce a grayscale characteristic that is somewhat darker and somewhat higher in luminance contrast, on a relative basis, compared to the corresponding reproduced grayscale on an sRGB reference display. A sample gamma=2.2 graph line is shown in 304. Furthermore, since the grayscale is produced by the additive combination of red, green, and blue light, the reproduction of R'G'B' encoded values corresponding to colored (non-achromatic) image areas will be somewhat higher in overall colorfulness on the broadcast television than on the sRGB reference display.

While the higher contrast of the broadcast television display explains, at least partially, the higher perceived luminance contrast and colorfulness of sRGB images when displayed on a broadcast television versus on an sRGB monitor, the fact that the broadcast television grayscale characteristic is overall darker than the sRGB monitor characteristic is counter to the perception of sRGB images displayed directly on broadcast televisions as being too light. There are two reasons for this. First, the display curve comparison, while being necessary to account for, fails to recognize that a given relative signal value intended for an sRGB monitor or a broadcast television necessarily corresponds to the same original-scene stimulus. Second, there are differing states of visual adaptation in the viewing of each display in its intended viewing environment that affects the relationship between colorimetry and color appearance.

Figure 4:
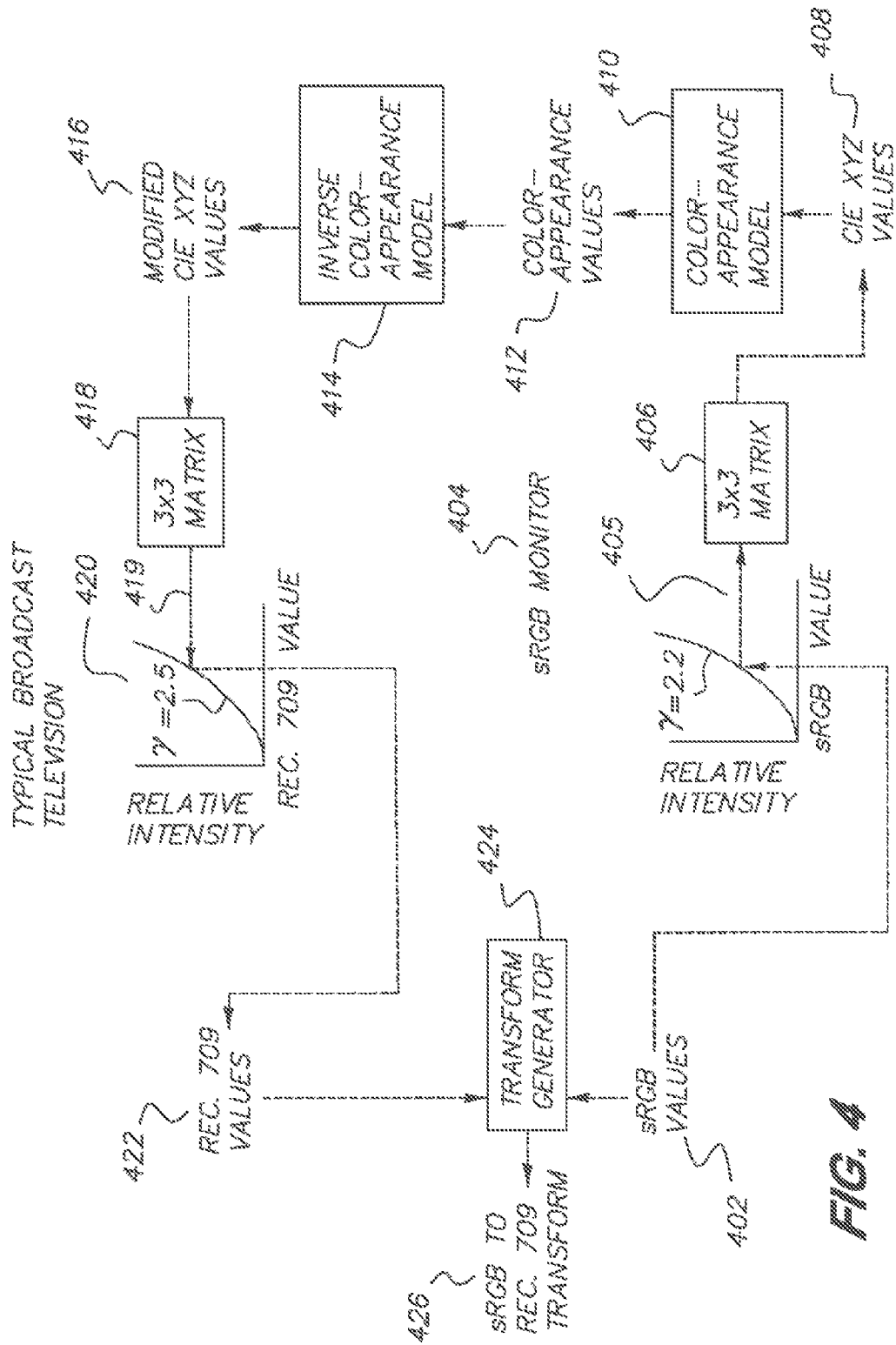
FIG. 4 shows a block diagram of transform generation based on color appearance modeling.

The IEC sRGB document addresses the situation of non-sRGB-compliant displays (see Annex C) and suggests a transformation in the form of a profile be used to bring the non compliant display to the sRGB reference characteristic. If the two displays have equivalent sets of RGB primary chromaticities and reference white points, this discrepancy can be corrected, in so far as possible, using a set of three 1-dimensional lookup tables. Such tables would be based on the difference between the actual display characteristic and the sRGB reference characteristic as shown in FIG. 4, and is shown in the figure for the difference between the typical broadcast video display and the sRGB reference display. It can be shown that the transformation adjusts the sRGB encoded values to Rec. 709 encoded values that produce the same relative intensities on the broadcast television display as the sRGB encoded values would produce on an sRGB reference monitor. While this correction improves the situation somewhat, the heretofore image quality problems associated with the display of sRGB encoded image values on a broadcast television set are still apparent, although to a somewhat lesser extent. This suggests there is something else going on that accounting for the difference between the colorimetric characteristics of the two displays does not fully correct.

One factor not addressed by correcting for the colorimetric differences between the two displays is the fact that the sRGB reference monitor is specified to be viewed under ambient conditions different from those that generally would be assumed for a typical broadcast television set.

It would be fair to assume that the typical broadcast television set used as a reference for producing high quality images when adjusting the colorimetric characteristics of a studio camera to produce a Rec. 709 compliant video signal would have been viewed in a dim or dark-surround condition, wherein the areas surrounding the displayed image are lower in luminance level than the overall luminance of the displayed image area, and would correspond to conditions that typically would be encountered in a broadcast television control room environment. The sRGB color space defines a set of reference ambient conditions under which the colorimetry produced by the sRGB reference monitor is intended to be displayed and viewed. These conditions correspond to an average surround condition wherein the areas surrounding the displayed image are approximately the same in luminance level as that of the overall displayed image.

This establishes a relationship between reproduced colorimetry and color appearance, which means that the relationship between colorimetry and color appearance is more closely correlated for the sRGB display average-surround conditions than for the assumed broadcast television dim/dark-surround conditions. In dim or dark-surround conditions, an observer will perceive a given color stimulus to appear somewhat lighter than the same color stimulus presented and viewed under average surround conditions. Also, an observer will perceive the luminance contrast of a grayscale to be somewhat lower in luminance contrast than when that same grayscale is presented and viewed under average-surround conditions.

There also are other factors involved which will influence the relationship between colorimetry and color appearance in the two environments which include, but are not limited to the degree to which the displayed image fills the observer's field of view, the absolute luminance of the displayed image itself, etc.

The IEC sRGB document acknowledges this situation as well, but Annex E of the specification simply points the reader to a reference for the CIECAM97 color-appearance model, with no guidance as to how this might be employed to address the situation. The CIECAM97s color-appearance model is described in the Sixth edition of "The Reproduction of Colour" by RWG Hunt, and the more recent CIECAM02 color-appearance model, as well as the RLAB, Hunt, Nayatani et al. color-appearance models are described in detail in the Second edition of "Color Reproduction Models" by Mark D. Fairchild. Both of these color appearance models are quite sophisticated and complex, requiring the user to measure and specify a variety of parameters and factors regarding the images and the environments in which they are to be viewed.

Referring to FIG. 4, starting with sRGB values 402 they are converted to RGB relative intensity values 405 for the sRGB standard monitor using the characteristic curve provided by the IEC standard document in 404. The relative intensity values 405 are converted to CIE XYZ colorimetric values 408 using primary conversion matrix 406, such as for example a 3×3 matrix computed from sRGB color primaries chromaticities and reference white point chromaticities provided by the IEC standard document using well known methods. The CIE XYZ values 408 are transformed into color appearance values 412 using color appearance model 410 such as one of the CIECAM color appearance models the parameters of which are appropriate for the sRGB viewing environment. The color appearance values 412 are converted to corresponding modified CIE XYZ colorimetric values 416 using an inverse color appearance model 414 the parameters of which are appropriate for the broadcast television viewing environment.

The modified CIE XYZ values 416 are then converted to RGB relative intensity values 419 using primary matrix 418 such as by using a 3×3 matrix computed from the color primaries chromaticity and reference white point chromaticities provided by the Rec. 709 standard using well-known methods. Relative intensity values 419 are converted to R'-G'-B' Rec. 709 values using an inverse broadcast television display characteristic curve 420. Transform generator 424 computes the transformation 426 relating sRGB values 402 to corresponding Rec. 709 values 422. Transform generator 424 could comprise 3 one-dimensional look-up-tables (LUTs) and can employ interpolation techniques.

Figure 5:
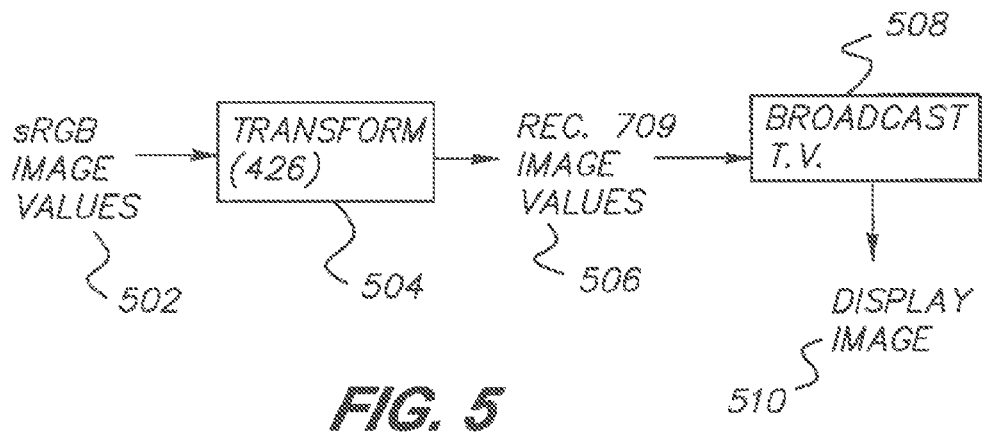
FIG. 5 shows a diagram of a transform of SRGB image values.

In FIG. 5 sRGB values 502 corresponding to a pictorial image are converted using the transform 504 in order to achieve Rec. 709 pictorial image values that are provided to a broadcast television 508 for displaying the displayed image 510. The displayed image 510 viewed in its intended viewing conditions should match, insofar as possible, the appearance of the sRGB image 502 viewed on an sRGB monitor in its intended viewing conditions. This would hold true if the broadcast television colorimetric characteristics and viewing conditions correspond to those used in the creation of transform 504.

One method for computing a transformation for converting sRGB image values into corresponding Rec. 709 image values utilizing techniques of color appearance matching and models can comprise, converting an image encoded in the sRGB color space to displayed colorimetry 408 according to the sRGB specification, converting the colorimetry to color appearance values 412 using one of a number of color-appearance models 410, and then converting those color appearance values to colorimetry 416 for the assumed Rec. 709 broadcast television viewing environment, and converting the colorimetry 416 to corresponding Rec. 709 encoding values 422. Again, the color appearance models are quite sophisticated, and require full characterization of the viewing environments involved which might entail complex photometric measurements or even subjective viewing experiments to be designed, performed, and analyze to determine some of the parameters.

Moreover, because of the mathematically sophisticated nature of the color-appearance models, the sequence of colorimetric and color-appearance transformations outlined above would have little likelihood of being executed in real time for HD-resolution image data refreshed at a rate of 60 frames per second using available computing technology at reasonable cost. Moreover, a direct transformation between the sRGB values and corresponding Rec.709 values determined using the above colorimetric and color-appearance transformation sequence is itself likely to be mathematically complex and difficult to execute given the time and cost constraints mentioned above.

Figure 6:
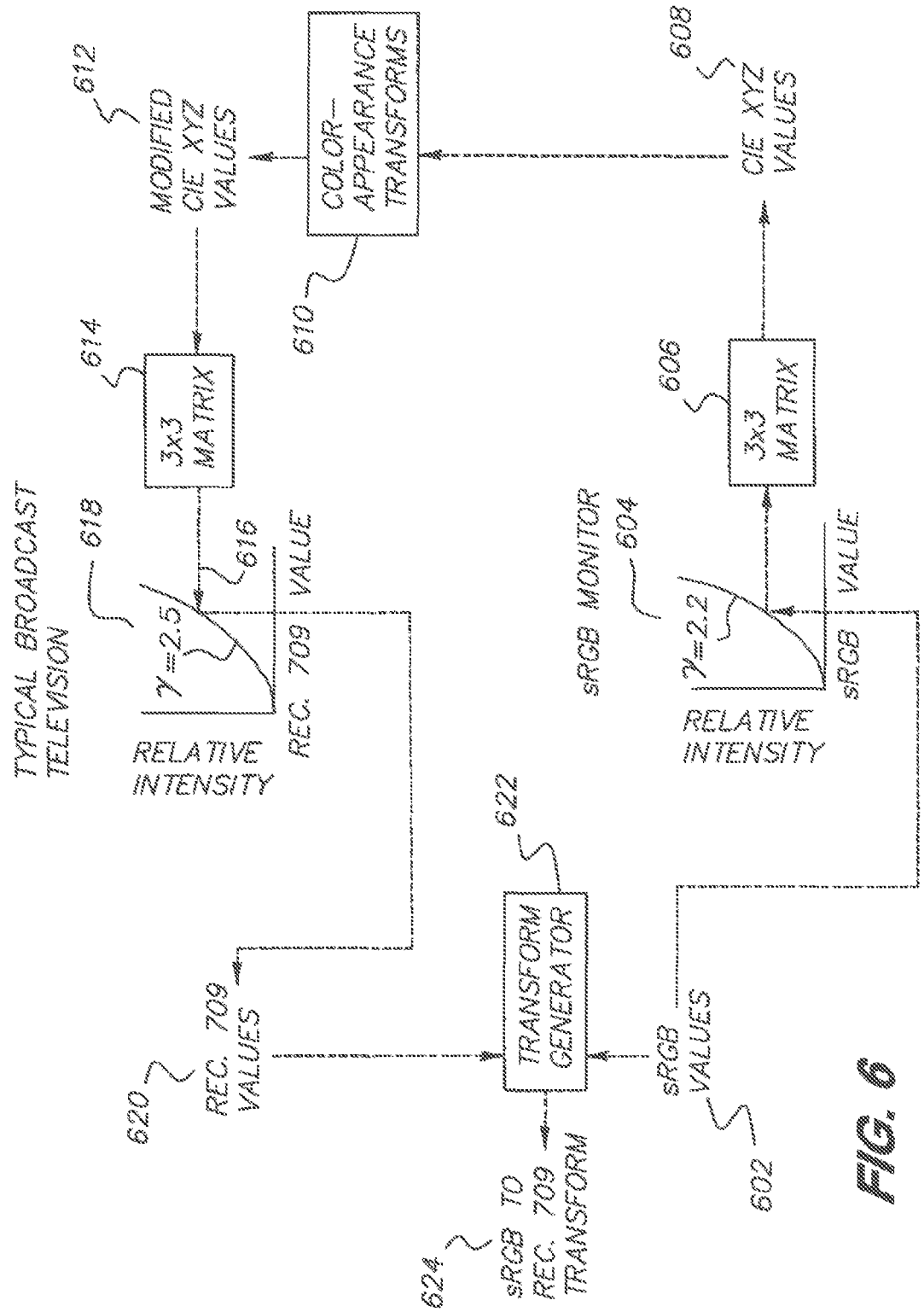
FIG. 6 shows a block diagram of a transform generation based on appearance-based colorimetry.

Another solution would be to use appearance-based colorimetric methods as set forth by Giorgianni and Madden in a book entitled, "Digital Color Management: Encoding Solutions" which discloses methods for adjusting image colorimetry intended to be viewed under one set of ambient conditions into colorimetric intended to be viewed under a second set of viewing conditions so as to preserve color appearance. Such methods have the advantage that the exemplary transformations given by those references are relatively straightforward mathematically and do not require a direct computation of numerical values expressive of color appearance. One example of such a method is shown in FIG. 6, which is similar to that described in FIG. 4 with the main differences being the CIE XYZ values 608 corresponding to the sRGB reference viewing environment are converted to visually equivalent CIE XYZ values 612 intended to be viewed in the broadcast television viewing environment using color appearance transform 610 which can be of the form of general brightness adaptation and lateral brightness adaptation transformations.

sRGB values 602 are converted to RGB relative intensity values for the sRGB standard monitor using the characteristic curve provided by the IEC standard document in 604. The relative intensity values are converted to CIE XYZ colorimetric values 608 using primary conversion matrix 606, such as for example a 3×3 matrix computed from sRGB color primaries chromaticities and reference white point chromaticities provided by the IEC standard document using well known methods. The modified CIE XYZ values 612 are then converted to RGB relative intensity values 616 using primary matrix 614 such as by using a 3×3 matrix computed from the color primaries chromaticity and reference white point chromaticities provided by the Rec. 709 standard using wellknown methods. Relative intensity values 616 are converted to R'-G'-B' Rec. 709 values using an inverse broadcast television display characteristic curve 618. Transform generator 622 computes the transformation 624 relating sRGB values 602 to corresponding Rec. 709 values 620. Transform generator 622 could comprise 3 one-dimensional look-up-tables (LUTs) and can employ interpolation techniques.

However, the above described methods while mathematically straightforward do not deal well with end-point conditions and still require some level of characterization of the respective viewing environments, which again can involve photometric measurements, subjective experiments, or assumptions. Furthermore, despite the advantages in simplicity of the aforementioned appearance-based colorimetric methods over the direct use of color appearance models as recommended in the IEC sRGB specification, the exemplary transformation do not deal well with practical end-point conditions. For example, if it is known that a given set of colorimetric values will appear lighter in a dim or dark viewing environment than they will in an average-surround viewing environment, all other factors being equal, then the transformations to compensate for that effect in the dim/dark environment will make all colors physically darker. That transformation will have the detrimental effect of clipping shadow detail and displaying values corresponding to whites, highlights, and highly illuminated image areas much lower in luminance than the maximum luminance capability of the display. Some method of dealing with the end-point conditions is required and these techniques almost always entail making compromises and tradeoffs.

What is needed is a mathematically simple and robust transformation to convert image data encoded in terms of the sRGB color space into corresponding Rec. 709 image-bearing signals (and from Rec. 709 to sRGB in other embodiments) that produces high quality reproductions of sRGB encoded images on television displays, can be executed in real time, deals well with endpoint conditions, etc.

A novel solution to the problem results by recognizing that in accordance with one embodiment of the disclosure, analogous to the manner in which the opto-electronic transfer characteristic of the Rec. 709 specification was derived, that today's digital-still cameras themselves must incorporate opto-electronic transfer characteristics in order to produce high quality pictures on sRGB monitors when viewed under sRGB ambient conditions. Under one embodiment of the disclosure, a novel transformation is created between the sRGB and Rec. 709 encodings that eliminates the need to characterize the respective viewing environments, assume or characterize a typical broadcast television display grayscale characteristic, employ mathematically complex color-appearance model transformations, employ appearance-based colorimetric transformations and experimentally derived end-point compromises.

Figure 7:
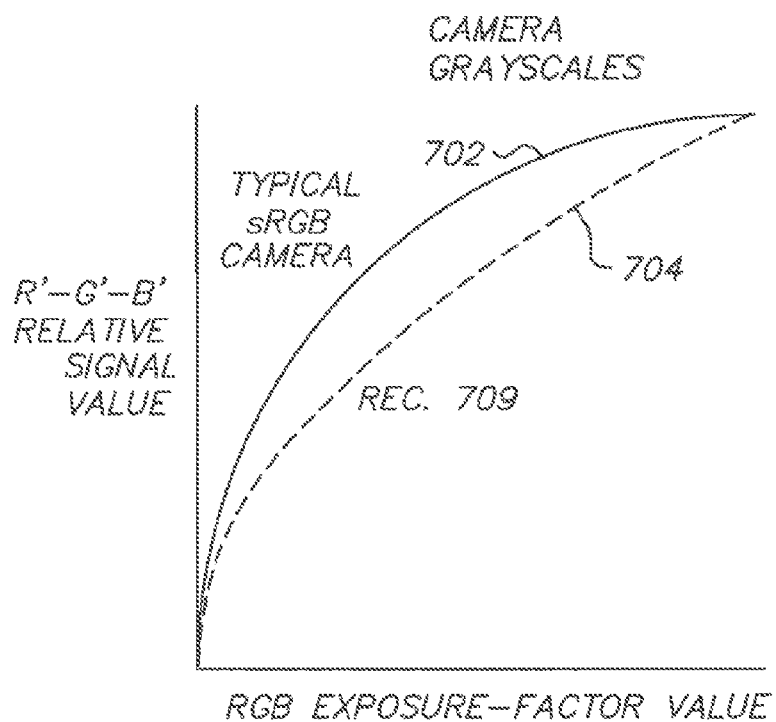
FIG. 7 shows a graph highlighting sRGB and Rec. 709 transfer characteristics.
Figure 8:
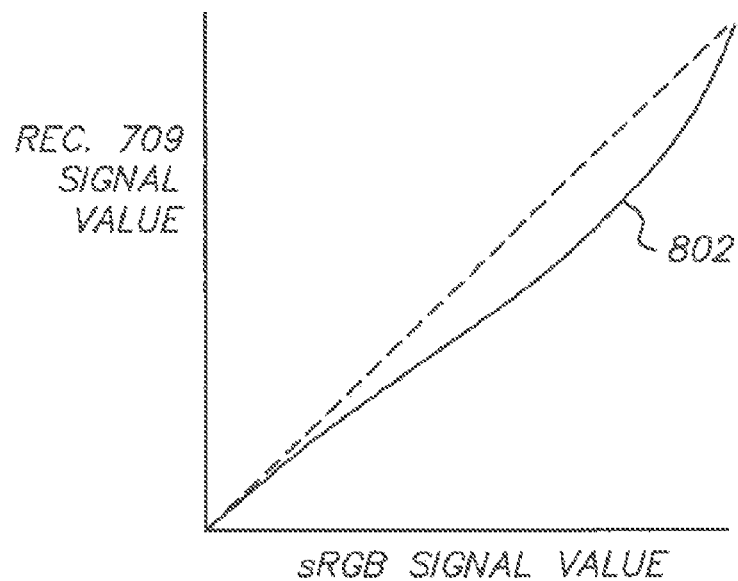
FIG. 8 shows a graph line highlighting a transformation that is derived relating sRGB values to corresponding Rec. 709 values in accordance to one aspect of the present disclosure.
Figure 9:
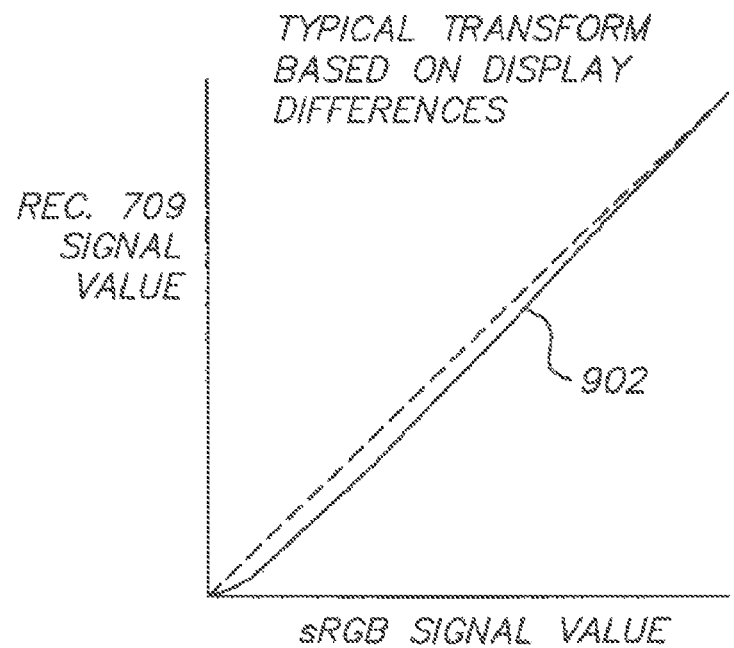
FIG. 9 shows a transform based on display differences in accordance with an aspect of the disclosure.

In a first embodiment as shown in FIG. 7, the Rec. 709 optoelectronic transfer characteristic 704 and the opto-electronic transfer characteristic of a known digital-still camera 702 which is obtained from documentation or by experiment are shown. A sequence of R=G=B scene exposure-factor values that adequately sample the usable range of exposure-factor values is defined. The set of exposure-factor values is converted to both sRGB values and Rec. 709 values using the respective opto-electronic transfer characteristics, and a transformation is derived relating sRGB values to corresponding Rec. 709 values as shown in FIG. 8 by graph line 802. If one wanted to convert from Rec. 709 to sRGB then the graph line 904 shown in FIG. 9 would apply.

Figure 10:
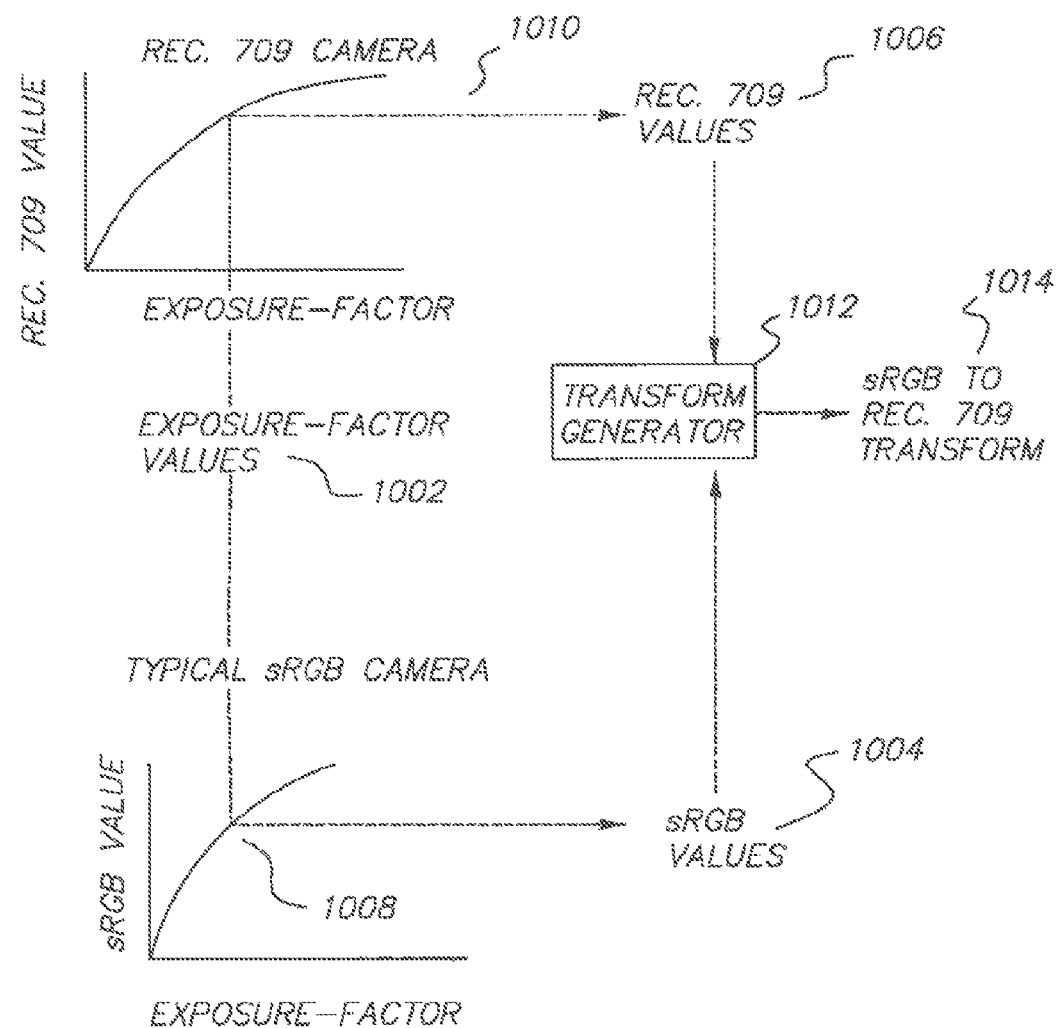
FIG. 10 shows a generation of a transform based on camera grayscale mapping in accordance with another aspect of the present disclosure.

In FIG. 10 a sequence of R=G=B scene exposure-factor values 1002 that adequately sample the usable range of exposure-factor values is defined. The set of exposure-factor values 1002 is converted to both sRGB values 1004 and Rec. 709 values 1006 using the respective opto-electronic transfer characteristic curves 1008 and 1010, and a transform generator 1012 derives a transform 1014 relating sRGB values to corresponding Rec. 709 values.

In a second preferred embodiment, a target or chart composed of a collection of reflective neutral (achromatic) patches is selected or assembled. Said patches should adequately sample the range of exposure-factor values that can be captured and recorded at a given exposure condition by digital-still camera based on the camera's capability. In the event that reflective samples cannot be obtained to span the entire exposure range of interest, selective illumination of one or more patches can be used to increase the range, or multiple exposures of said chart can be made using differing levels of illumination with the camera in a fixed exposure condition for said exposure series. sRGB images of the captured chart or charts are interrogated to determine the sRGB values resulting for each patch at each illumination condition. Exposure-factor values are calculated from the determined exposure-factor values for each patch and illumination condition based on the patch's reflectivity factor and its relative illumination. Rec. 709 values are determined for each patch and illumination condition using the Rec. 709 optoelectronic transfer equations provided by the ITU-R BT.709 recommendation. A transformation is derived relating the determined sRGB values and the corresponding calculated Rec. 709 values. As before, the transformation can convert in the opposite direction as well.

In a third embodiment, the second embodiment is practiced with the additional step that the illuminated charts also are captured by a broadcast video camera, the resulting image-bearing signals are interrogated to determine Rec. 709 values, and a similar relationship is derived. In one scenario, the relationship can be based on one actual digital still camera's characteristic and the Rec. 709 characteristic, the resulting relationship then applied to all sRGB images regardless of the camera used to capture the sRGB image. Then the camera-to-camera image reproduction differences can be retained in the converted Rec. 709 images, while still producing high-quality displays of sRGB images on a broadcast television. The digital still camera characteristic employed alternately could be a hypothetical characteristic that may or may not correspond to the characteristic of an actual camera.

In another embodiment, the digital-still camera characteristic might be taken as a characteristic that is an average of more than one actual digital still camera characteristics comprising one or more models and/or one or more manufacturers. The same variants can be said for the Rec. 709 characteristic: Use the ITU standard, one for a particular camera, a hypothetical camera (other than the ITU), or an average. In still another embodiment, the system could interrogate metadata associated with each sRGB image and either compute or retrieve from a database a transform customized for that particular camera or family of camera.

Figure 11:
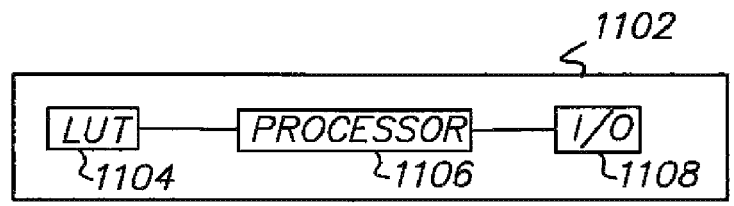
FIG. 11 shows a diagram of an electronic device in accordance with one aspect of the present disclosure.
Figure 12:
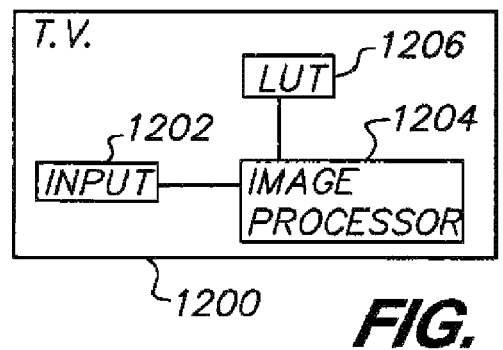
FIG. 12 shows a television in accordance with another aspect of the present disclosure.

In FIG. 11 there is shown an electronic device 1102 such as a digital camera that includes one or more look-up tables 1104 that provide transformation information to processor or transform generator 1106. Transform generator 1106 can be performed for example by a standard processor, microcontroller or combination of software/hardware as known in the art. The particular transformations performed by processor 1106 and LUT 1104 are performed as discussed herein. In one illustrative example images captured by the digital camera and encoded in terms of sRGB are transformed into Rec. 709 compliant images which are provided to input/output (I/O) port 1108 so that when the digital camera is connected to a television or other broadcast type monitor the images displayed are of much better quality than had the sRGB encoded images been displayed without such transformation. The information stored in the LUT 1104 can include camera model or camera manufacturer adjustments that are made to the captured images or alternatively an average or other aggregation of different camera manufacturer image information (e.g., Eastman Kodak, Canon, etc.). Although the example provided has dealt with transforming from sRGB encoded images to Rec. 709 images, transformation in the opposite direction (e.g., Rec. 709 to sRGB) can be performed for other types of electronic devices.

Such transformations also could be applied to sRGB images that did not originate from digital still cameras. For instance, some images are created at the display using scene-modeling and lighting modeling software. Even though there was no real-life original scene or camera involved, such images can be created to be sRGB compatible, and thus can have such transformations applied to convert to Rec. 709. Likewise, images captured originally on color-negative or color-reversal film elements, or images on reflection prints or other print materials are routinely scanned and converted to sRGB image files. Again, since no digital still camera was involved in the creation of such sRGB images, they still can be treated as if they were captured digitally and such transformations applied to convert them the Rec. 709.

A practical application of the present disclosure can include a broadcast television set 1200 that in addition to the typical composite, component, HDMI, sVideo and other standard video inputs also includes an integrated card reader 1202 that enables digital images stored on SD and CF cards, memory sticks, and the like, to be read and displayed on the television screen. Similarly, sRGB images might be stored on a USB memory device and the television might be equipped with USB input capability. Or, an external memory card reader might accept sRGB images from a memory card and generate color-image signals that are input to the TV's USB input via a USB cable connection. When the sRGB images are read and decoded and treated like all other Rec. 709 sources, the resulting displayed images appear too light, too high in luminance contrast, and too high in colorfulness when compared to images reproduced from Rec. 709 input sources using the other video inputs. An improved television 1200 incorporating a card reader 1202 would provide a set of lookup tables 1206 in its color signal processing to convert the sRGB image values read from the card reader into Rec. 709 compatible image-bearing signals. Such lookup tables (LUT) 1206 might be incorporated as part of the card reader hardware 1202 itself or as an intermediary step between the card reader 1202 and the main TV processor 1204. The TV processor which can comprise for example a microprocessor, microcontroller or some other equivalent circuitry or some other combination of hardware/software or just software that can perform the transformations using the information in the LUT 1206.

In another practical example, a broadcast television equipped with an integrated card reader and/or USB input capability reads and decodes sRGB image data, generates a video signal from such data and is sent to the TVs main image processor. The incompatibility between the video signals generated by sRGB image sources and Rec. 709 video sources can be accounted for using a set of lookup tables following the TV main processor and the lookup tables typically incorporated as part of the TV's output signal processing whose primary function is to account for the display or panel physical characteristic and some aim characteristic. Likewise, the net effect of the sRGB-to-Rec. 709 conversion lookup table and the panel characterization lookup table could be accomplished by a single lookup table implemented at the same point in the output signal processing as the panel characterization table. The TV's main processor then would need to detect that a card-reader or USB input image source is selected and then load such lookup tables in the output signal processing. When the TV input signal source is changed to one of the Rec. 709 compatible input sources, the standard output signal processing lookup table is retrieved and loaded.

As another similar example to the above, instead of the television loading a custom panel characterization lookup table to also compensate for the differences between the sRGB and Rec. 709 encodings, the TV might alternately invoke custom brightness, contrast, and color settings when sRGB input image sources are detected. While the resulting displayed images would exhibit improved visual quality and compatibility with Rec. 709 compatible input sources, the ultimate quality achieved may not approach that obtained from the lookup table based examples described above. It is recognized that various television manufacturers sometimes use other nomenclature when referring to brightness, contrast, and color attributes.

In still another example, the disclosure could be incorporated into a home media player. These devices help to integrate and manage multiple input sources to a home television set, including inputs from images stored on a home computer and content from the internet. The home media player allows the user to switch between input signal sources (cable, satellite, DVD player, etc) and outputs an HDMI, composite, or other standard video signal that is fed to the TV receiver. The television then generally is set to primarily use the input from the media player, so for optimal performance, the signal generated by the media player from all input sources should be Rec. 709 compatible. As with the above examples, it is necessary for the media player to apply a conversion from sRGB values generated by card reader or USB inputs, as well as to sRGB images from image files residing on computers connected by wire or wireless connection to the media player or images from other internet sources. In this way, the overall tone and color reproduction from all Rec.709 compatible and sRGB input sources are displayed in a visually compatible fashion.

In yet another example, digital-still cameras capture images of original scenes, encode the color-image data in the sRGB color space, and store the encoded images in jpeg files on the camera's internal memory or an SD or CF memory card, memory stick, or the like. Many digital-still cameras also can generate output video signals for viewing stored images on a television set as in a slideshow, for example. The camera typically includes a video output port into which can be inserted a video cable which can be connected to an input on a broadcast television set. An improved digital still camera would include in its output signal processing for generating output video signals, a conversion from the sRGB color space to Rec. 709 so that the images displayed on the broadcast television set are of high quality and are compatible with Rec.709 encoded images from other video sources.

In still yet another example, sRGB jpeg image files can be used to create a slideshow sequence of the images that might include animated transitions between images as well as other motion-based effects such as zoom-and-pan. The slideshows, including the animated effects can be stored in an mpeg or other motion image file format file for playing on a broadcast television. The MPEG file also can be stored on a CD ROM disk or DVD. In order for the mpeg slideshow to display with optimum image quality, an improved color-imaging system would first apply a transform to the sRGB still-image data to make it compatible with Rec. 709 before creating the mpeg file. The sRGB to Rec. 709 transformations for the above scenarios can be computed in a variety of ways.

The disclosure has been described in detail with particular reference to certain preferred embodiments thereof, but it will be understood that variations and modifications can be effected within the spirit and scope of the disclosure. For instance, the disclosure also can apply to other broadcast video encoding standards such as SMPTE 240M, Rec. 1361, and the like.

PARTS LIST 102 optoelectronic transfer
202 graph line
302 graph line
304 graph line
402 sRGB values
404 IEC standard document
405 intensity values
406 conversion matrix
408 colorimetric values
410 color appearance model
412 color appearance values
414 inverse color appearance model
416 XYZ colorimetric values
418 primary matrix
419 intensity values
420 characteristic curve
422 encoding values
424 transform generator
426 transformation
502 sRGB image
504 transform
506 image values
508 broadcast television
510 displayed image
602 sRGB values
604 standard document
606 conversion matrix
608 XYZ colorimetric values
610 color appearance transform
612 XYZ values
614 primary matrix
616 intensity values
618 characteristic curve
620 values
622 transform generator
624 trans formation
702 digital still camera
704 transfer characteristic
802 graph line
902 graph line
904 graph line
1002 exposure factor values
1004 sRGB values
1006 values
1008 characteristic curve
1010 characteristic curve
1012 trans form generator
1014 trans form
1102 electronic device
1104 look-up tables (LUT)
1106 transform generator
1108 I/O port
1200 broadcast television
1202 card reader
1204 TV processor
1206 look-up tables

What is claimed is:

1. An electronic device comprising:
an encoder configured to encode captured images into a color space according to a first specification;
a memory configured to store the encoded captured images; and
a transform generator configured to transform the encoded captured images into compliant images according to a second specification, wherein the transform generator selects a transform based at least in part on metadata associated with the captured images.

2. The electronic device of claim 1, wherein the first specification is sRGB and the color space is sRGB color space.

3. The electronic device of claim 2, wherein the second specification is Rec. 709.

4. The electronic device of claim 3, wherein the transform generator includes a look-up table (LUT) with LUT information used in the transformation of captured images between sRGB color space and Rec. 709, wherein the metadata is used at least in part to determine the LUT information used in the transformation of captured images.

5. The electronic device of claim 4, wherein the metadata comprises manufacturer encoding characteristics.

6. The electronic device of claim 4, wherein the metadata comprises encoding characteristics of more than one manufacturer.

7. The electronic device of claim 1, wherein the electronic device comprises a camera.

8. The electronic device of claim 1, wherein the transform generator utilizes interpolation techniques.

9. A method for transforming an image expressed in terms of one image encoding specification to a second image encoding specification, the method comprising:
defining, by a processing device, a sequence of first image values according to a first specification;
determining, by the processing device, corresponding second image values for the first image values;
deriving, by the processing device, a transform between the first image values and the second image values, wherein the transform is derived at least in part based on metadata associated with the image; and
applying, by the processing device, the transform to the image encoded in image encoding according to the first specification.

10. The method of claim 9, wherein the first specification is sRGB and the first image values are sRGB image values.

11. The method of claim 10, wherein the second specification is Rec. 709 and the second image values are Rec. 709 image values.

12. The method of claim 11, wherein deriving a transform includes accessing a look-up table (LUT) with LUT information used in the transformation of the image between sRGB color space and Rec. 709, wherein the metadata is used at least in part to determine the LUT information used in the transformation of the image.

13. The method of claim 12, wherein the metadata comprises manufacturer encoding characteristics.

14. The method of claim 12, wherein the metadata comprises encoding characteristics of more than one manufacturer.

15. An apparatus comprising:
a processing device configured to:
define a sequence of first image values according to a first specification;
determine corresponding second image values for the first image values;
derive a transform between the first image values and the second image values, wherein the transform is derived at least in part based on metadata associated with an image; and
apply the transform to the image encoded in image encoding according to the first specification.

16. The apparatus of claim 15, wherein the first specification is sRGB and the first image values are sRGB image values.

17. The apparatus of claim 16, wherein the second specification is Rec. 709 and the second image values are Rec. 709 image values.

18. The apparatus of claim 17, wherein the processor is configured to derive the transform by accessing a look-up table (LUT) with LUT information used in the transformation of the image between sRGB color space and Rec. 709, wherein the metadata is used at least in part to determine the LUT information used in the transformation of the image.

19. The apparatus of claim 18, wherein the metadata comprises manufacturer encoding characteristics.

20. The apparatus of claim 18, wherein the metadata comprises encoding characteristics of more than one manufacturer.

* * * * *